United States Patent
Choi et al.

(10) Patent No.: US 9,241,234 B2
(45) Date of Patent: Jan. 19, 2016

(54) METHOD AND APPARATUS FOR TRANSMITTING DATA IN WIRELESS COMMUNICATION SYSTEM

(75) Inventors: Jinsoo Choi, Gyeonggi-do (KR);
Hangyu Cho, Gyeonggi-do (KR);
Kyujin Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 14/000,919

(22) PCT Filed: Nov. 30, 2011

(86) PCT No.: PCT/KR2011/009207
§ 371 (c)(1),
(2), (4) Date: Aug. 22, 2013

(87) PCT Pub. No.: WO2012/118265
PCT Pub. Date: Sep. 7, 2012

(65) Prior Publication Data
US 2013/0329689 A1  Dec. 12, 2013

Related U.S. Application Data

(60) Provisional application No. 61/448,656, filed on Mar. 3, 2011.

(51) Int. Cl.
*H04W 4/00* (2009.01)
*H04L 1/18* (2006.01)
*H04L 5/00* (2006.01)
*H04W 72/04* (2009.01)
*H04W 24/04* (2009.01)
*H04L 1/00* (2006.01)

(52) U.S. Cl.
CPC ............. *H04W 4/005* (2013.01); *H04L 1/1829* (2013.01); *H04L 1/1867* (2013.01); *H04L 5/0007* (2013.01); *H04L 5/0055* (2013.01); *H04L 5/0035* (2013.01); *H04L 2001/0097* (2013.01); *H04W 24/04* (2013.01); *H04W 72/04* (2013.01)

(58) Field of Classification Search
None
See application file for complete search history.

(56) References Cited

U.S. PATENT DOCUMENTS

2010/0097978 A1\* 4/2010 Palanki et al. ................ 370/315
2011/0194485 A1\* 8/2011 Horneman et al. ........... 370/315

OTHER PUBLICATIONS

Jinsoo Choi, "[PWR] for 802.16p PWR RG discussion on DC#1 issue", IEEE 802.16 Broadband Wireless Access Working Group, IEEE C802.16p-rg-11/0037, Feb. 15, 2011.
Kiseon Ryu, "[IEEE 802.16p Machine to Machine (M2M): Proposed Text from Power Saving (PMR) Rapporteur Group", IEEE 802.16 Broadband Wireless Access Working Group, IEEE C802.16p-11/0002, Feb. 26, 2011.

(Continued)

*Primary Examiner* — Derrick Ferris
*Assistant Examiner* — Kodzovi Acolatse
(74) *Attorney, Agent, or Firm* — Morgan, Lewis & Bockius LLP

(57) ABSTRACT

A method for transmitting data from a first User Equipment (UE) in a wireless communication system is provided. In the method, the first UE receives uplink data of a second UE from the second UE on a first uplink subframe of an Nth frame and transmits the received uplink data of the second UE to a base station on a first uplink subframe of an (N+1)th frame and then receives feedback information associated with the transmitted uplink data of the second UE from the base station.

12 Claims, 6 Drawing Sheets

(56) References Cited

OTHER PUBLICATIONS

Kyujin Park, et al., "Definition of Device Collaboration Mode for Low Power Consumption", IEEE 802.16 Broadband Wireless Access Working Group, IEEE C802.16p-10_0030, Dec. 30, 2010.

Kyujin Park, et al., "Device Cooperation for M2M Communications", IEEE 802.16 Broadband Wireless Access Working Group, IEEE C802.16p-10/0004r2, Nov. 10, 2010.

International Search Report and Written Opinion issued in corresponding International Patent Application No. PCT/KR2011/009207 dated Jun. 22, 2012.

* cited by examiner $L_1 \ll L_2$ $L_1$: Pathloss between near - cell M2M device and BS
$L_2$: Pathloss between cell - edge M2M device and BS (a) Transmission through cooperative device (b) Transmission through anchor device

METHOD AND APPARATUS FOR TRANSMITTING DATA IN WIRELESS COMMUNICATION SYSTEM

TECHNICAL FIELD

The present invention relates to wireless communication, and more particularly, to a method and apparatus for transmitting data by a Machine to Machine (M2M) device, to which M2M communication is applied, in a wireless communication system.

BACKGROUND ART

Although conventional communication is mostly Human to Human (H2H) communication performed between terminals of users via a base station, Machine to Machine (M2M) communication has become possible along with development of communication technology. The term 'M2M communication' refers to communication that is performed between electronic devices as the term states. Although, in a broad sense, the term 'M2M communication' refers to wired or wireless communication between electronic devices or communication between a device that is controlled by a human and a machine, the term has generally been used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed, creating a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring of machines and facilities. In the future, M2M communication will be used for a wider variety of purposes, in combination with existing mobile communication and wireless high-speed Internet or low-power communication solutions such as Wi-Fi and Zig-Bee, and will no longer be limited to the B2B market and will expand its application field into the B2C market.

In the M2M communication era, all machines equipped with a SIM card can transmit and receive data such that it is possible to remotely manage and control all such machines. For example, the field of application of M2M communication technology is greatly broad such that M2M communication technology can be used for a great number of devices and equipment such as cars, trucks, trains, containers, vending machines, and gas tanks.

The power consumption problem is very important for the M2M device due to the characteristics of the M2M device. Thus, the M2M device reports to the base station in a long-term manner or is triggered by an event to report to the base station. That is, while the M2M device mostly remains in an idle state, the M2M device may be awoken into an active state at intervals of a long period or when an event has occurred. Most M2M devices have low mobility or have no mobility (i.e., are stationary). As the number of stationary M2M device application types persistently increases, a very large number of such M2M devices will become present in the same base station.

One feature of the M2M device is a time-controlled operation. Time-controlled traffic implies absence of 'ad-hoc' packet transmission to or from an M2M device. The system may support time-controlled operation and the M2M device may transmit or receive data only within a predefined time interval. Most M2M applications include a portion corresponding to time-controlled traffic. M2M applications differ only in the occupancy ratio of time-controlled traffic to ad-hoc traffic.

Another feature of the M2M device is low mobility or no mobility. That is, the M2M device may remain stationary for a long time. The system can simplify or optimize mobility-related operations for specific M2M applications having fixed positions such as applications for secured access and surveillance, public safety, payment, remote maintenance and control, and metering.

However, no studies have been conducted on a method of transmitting data from an M2M device taking into consideration such characteristics.

DISCLOSURE OF INVENTION

Technical Problem

An object of the present invention devised to solve the problem lies on a method and apparatus for transmitting data in a wireless communication system, which can efficiently support M2M devices in the wireless communication system.

Objects of the present invention are not limited to those described above and other objects will be clearly understood by those skilled in the art from the following description.

Solution to Problem

The object of the present invention can be achieved by providing a method for transmitting data in a first user equipment of a wireless communication system, the method including receiving uplink data of a second user equipment from the second user equipment on a first uplink subframe of an Nth frame, transmitting the received uplink data of the second user equipment to a base station on a first uplink subframe of an (N+1)th frame, and receiving feedback information associated with the transmitted uplink data of the second user equipment from the base station.

The method further includes retransmitting the uplink data of the second user equipment to the base station on a first uplink subframe of an (N+2)th frame, when the received feedback information is negative-acknowledgement (NACK) information indicating a failure to receive the uplink data of the second user equipment.

The Nth frame and the (N+2)th frame are intervals in which the first user equipment operates in an off-state mode for power saving and the (N+1)th frame is an interval in which the first user equipment operates in an on-state mode in which the first user equipment can transmit or receive data.

Each uplink subframe of the Nth frame and the (N+2)th frame is a Device to Device (D2D) listening interval in which the first user equipment receives uplink data of the second user equipment from the second user equipment and the D2D listening interval is included in an interval in which the first user equipment operates in the off-state mode.

An uplink resource region through which the first user equipment receives the uplink data of the second user equipment from the second user equipment is identical to an uplink resource region through which the first user equipment transmits the uplink data of the second user equipment to the base station.

The interval in which the first user equipment operates in the off-state mode includes a D2D listening interval in which the first user equipment receives data and decodes the received data.

D2D communication is performed between the first user equipment and the second user equipment.

In another aspect of the present invention, provided herein is an apparatus for transmitting data in a wireless communication system, the apparatus including a transmitter, a receiver, and a processor configured to control the receiver to receive uplink data of a first user equipment from the first user equipment on a first uplink subframe of an Nth frame, configured to control the transmitter to transmit the received uplink data of the first user equipment to a base station on a first uplink subframe of an (N+1)th frame, and configured to control the receiver to receive feedback information associated with the transmitted uplink data of the first user equipment from the base station.

The processor is configured to control the transmitter to retransmit the uplink data of the first user equipment to the base station on a first uplink subframe of an (N+2)th frame, when the received feedback information is negative-acknowledgement (NACK) information indicating a failure to receive the uplink data of the first user equipment.

The Nth frame and the (N+2)th frame are intervals in which the apparatus operates in an off-state mode for power saving and the (N+1)th frame is an interval in which the apparatus operates in an on-state mode in which the apparatus can transmit or receive data.

Each uplink subframe of the Nth frame and the (N+2)th frame is a Device to Device (D2D) listening interval in which the apparatus receives uplink data of the first user equipment from the first user equipment and the D2D listening interval is included in an interval in which the apparatus operates in the off-state mode.

An uplink resource region through which the apparatus receives the uplink data of the first user equipment from the first user equipment is identical to an uplink resource region through which the apparatus transmits the uplink data of the first user equipment to the base station.

The interval in which the apparatus operates in the off-state mode includes a D2D listening interval in which the apparatus receives data and decodes the received data.

The apparatus performs D2D communication with the first user equipment.

Advantageous Effects of Invention

According to embodiments of the present invention, M2M devices can quickly and efficiently transmit data in a wireless communication system.

Advantages of the present invention are not limited to those described above and other advantages will be clearly understood by those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the wireless communication system is an IEEE 802.16 system, the following descriptions, except descriptions specific to IEEE 802.16, may be applied to any other wireless communication system (for example, an LTE/LTE-A system).

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term 'terminal' is used to generally describe any mobile or stationary user device such as a User Equipment (UE), a Mobile Station (MS), or an Advanced Mobile Station (AMS). In addition, the term 'base station (BS)' is used to generally describe any network node that communicates with the terminal such as a Node B, an eNode B, Advanced Base Station (ABS), or an Access Point (AP).

In a wireless communication system, a user equipment can receive information through downlink from a base station and can transmit information through uplink. Information transmitted or received by the user equipment includes data and various control information and various physical channels are provided according to the type or usage of the information transmitted or received by the user equipment.

Figure 1:
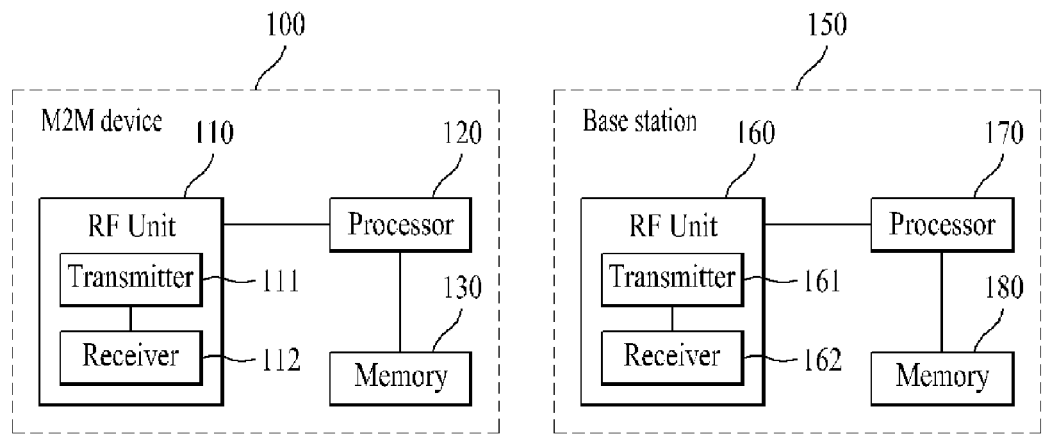
FIG. 1 illustrates a configuration of an M2M device and a base station according to an embodiment of the present invention.

FIG. 1 illustrates a configuration of an M2M device and a base station according to an embodiment of the present invention.

As shown in FIG. 1, the M2M device 100 and the base station 150 may include RF units 110 and 160, processors 120 and 170, and memories 130 and 180, respectively. The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112. When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the type of application. When the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described below.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

Such a device that communicates in an M2M manner as described above can be referred to as an M2M device, an M2M communication device, or a Machine Type Communication (MTC) device. On the other hand, a conventional terminal (or user equipment) may be referred to as a Human Type Communication (HTC) terminal or a Human to Human (H2H) device.

As described above, the M2M device mostly has low mobility or has no mobility. This indicates that the M2M device is stationary for a long time. In addition, the M2M device may support time-control operations. That is, the M2M device may transmit or receive data only within predefined time intervals. The M2M device also transmits a small amount of data and has a relatively long data transmission period. Due to such characteristics, low power consumption is required for M2M devices.

Figure 2:
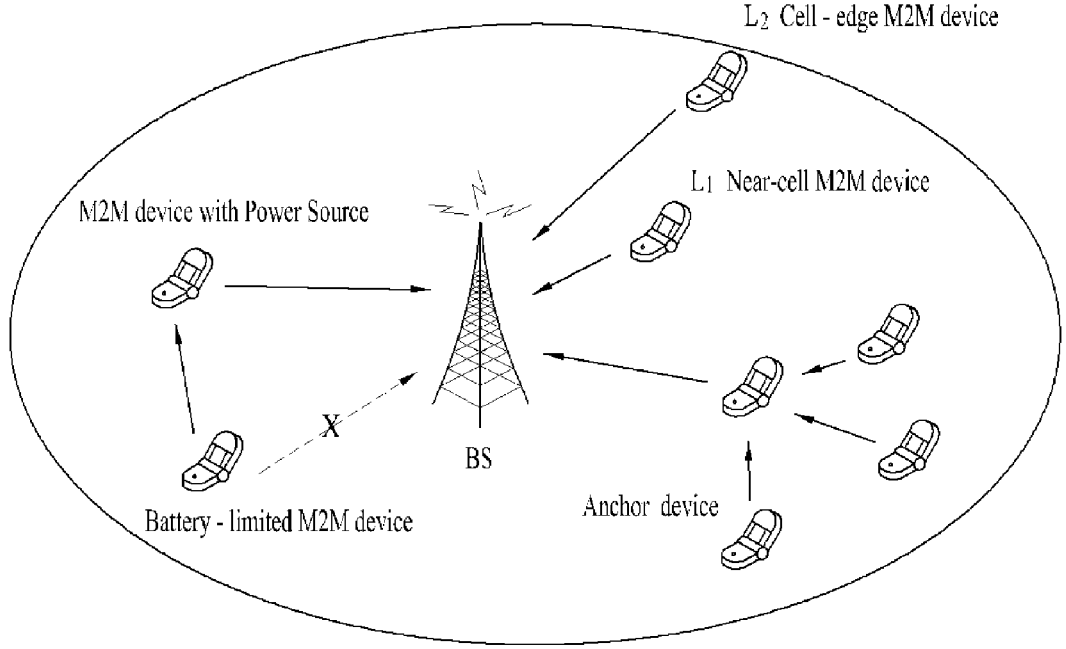
FIG. 2 illustrates a structure for device cooperation based on a mobile relaying scheme according to an embodiment of the present invention.

FIG. 2 illustrates a structure for device cooperation based on a mobile relaying scheme according to an embodiment of the present invention. Device cooperation can extend power life of M2M devices having limited power. For example, an M2M device having a power source may relay data traffic transmission of an adjacent M2M device having limited power. In addition, an anchor device having a power source may collect data traffic of adjacent M2M devices having limited power and transmit the data traffic to a base station.

In this manner, device cooperation allows M2M devices having limited power to reduce power consumption required for data traffic transmission and to achieve path-loss gain. Device cooperation can also solve non-uniformity of power consumption of fixed M2M devices. Fixed M2M devices may have different power consumptions and power lives depending on geographical environments between the fixed M2M devices and a base station. Such different power consumptions and power lives are due to different path losses and different required transmission powers. M2M devices distant from the base station require higher power to transmit data traffic than M2M devices close to the base station. Thus, M2M devices distant from the base station consume more power than M2M devices close to the base station and therefore M2M devices distant from the base station have short power lives. Accordingly, using device cooperation, it is possible to solve non-uniformity of power consumption of fixed M2M devices.

Figure 3:
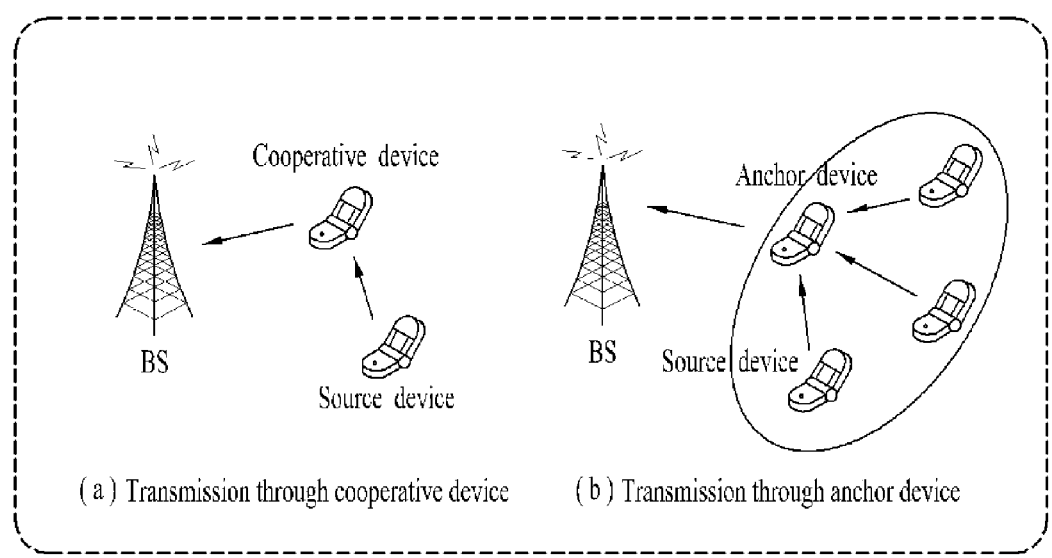
FIG. 3 illustrates an exemplary method for transmitting data through a cooperative M2M device and an exemplary method for transmitting data through an anchor M2M device.

FIG. 3 illustrates an exemplary method for transmitting data through a cooperative M2M device and an exemplary method for transmitting data through an anchor M2M device.

Device cooperation methods may be classified into a method using a cooperative M2M device and a method using an anchor M2M device. FIG. 3(a) illustrates an example of data transmission through a cooperative M2M device and FIG. 3(b) illustrates an example of data transmission through an anchor M2M device.

The cooperative M2M device may perform functions similar to a relay station. That is, a source M2M device may transmit data traffic to a cooperative M2M device through a Device to Device (D2D) link and a cooperative M2M device may transmit the data traffic received from the source M2M device to a base station (BS).

The anchor M2M device is an anchor-type cooperative M2M device that receives data traffic from a plurality of source M2M devices and transmits the received data traffic to the base station.

Figure 4:
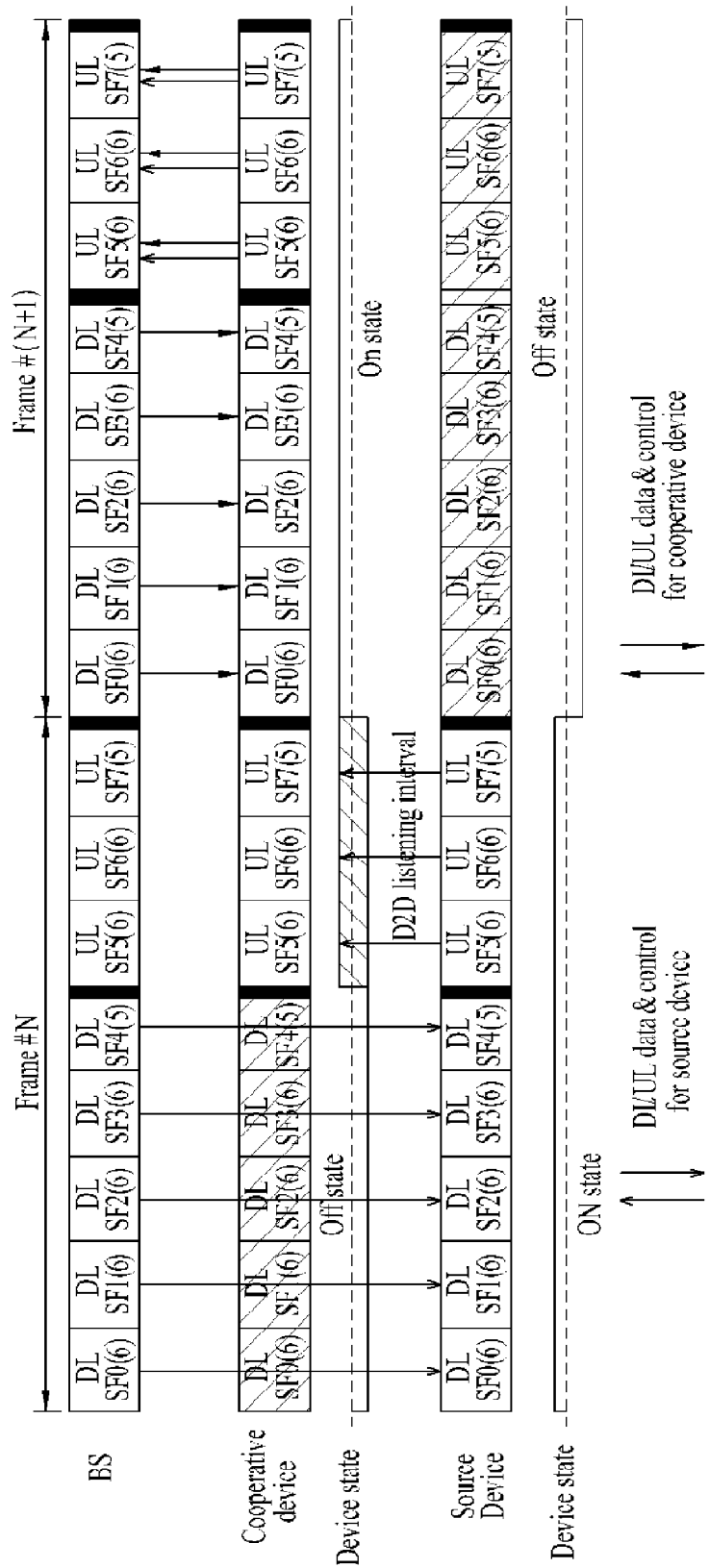
FIG. 4 illustrates a frame structure for a wireless communication system to which device cooperation is applied according to an embodiment of the present invention.

FIG. 4 illustrates a frame structure for a wireless communication system to which device cooperation is applied according to an embodiment of the present invention. Specifically, FIG. 4 illustrates frame structures for a base station, a cooperative M2M device (C-M2M device), and a source M2M device (S-M2M device). Although this embodiment will be described with reference to uplink structures, it will be apparent that the same method is applicable to downlink structures.

The C-M2M device and the S-M2M device have two state modes, an on-state mode and an off-state mode. In the on-state mode, the S-M2M device receives downlink data and downlink control information from the base station on a downlink subframe and transmits uplink data and uplink control information to the C-M2M device on an uplink subframe.

The C-M2M device receives downlink data and downlink control information from the base station on a downlink subframe and transmits uplink data and uplink control information to the base station on an uplink subframe. In addition, the C-M2M device transmits the uplink data and uplink control information of the S-M2M device received from the S-M2M device in a D2D listening interval of the off-state mode to the base station.

In the off-state mode, the S-M2M device operates in a power saving mode. The C-M2M device receives uplink data and uplink control information of the S-M2M device from the S-M2M device on an uplink subframe. In a downlink subframe interval, the S-M2M device operates in a power saving mode. An uplink subframe interval in the off-state mode is referred to as a D2D listening interval.

On the other hand, in the off-state mode, the S-M2M device can receive data and control information. However, the S-M2M device does not decode the received data and control information for power saving although the S-M2M device can decide to receive and decode specific control information (for example, ACK/NACK information).

An uplink resource for the C-M2M device to transmit uplink data of the S-M2M device to the base station is determined according to a synchronous (non-adaptive) HARQ retransmission scheme.

In the non-adaptive HARQ retransmission scheme, the C-M2M device does not explicitly receive allocation of a resource region for uplink data of the S-M2M device from the base station through a downlink control channel but instead transmits the uplink data of the S-M2M device received from the S-M2M device to the base station in a subsequent frame using the same uplink resource region as that in which the C-M2M device has received the uplink data from the S-M2M device in a D2D listening interval in the off-state mode. This can be confirmed through a HARQ NACK feedback received from the base station.

That is, even when the C-M2M device has not received allocation information of a resource for uplink data of the S-M2M device, the C-M2M device can transmit uplink data of the S-M2M device at the same uplink subframe position in a frame subsequent to a frame in which the C-M2M device has received the uplink data from the S-M2M device at the same uplink subframe position since a HARQ-timing rule is fixedly applied. Fixed application of the HARQ-timing rule indicates that, if the base station can transmit HARQ ACK/NACK information for uplink data of the S-M2M device, it is possible to implicitly know a next uplink subframe position with reference to the transmission time of the HARQ ACK/NACK.

On the other hand, in an adaptive HARQ retransmission scheme, the C-M2M device can explicitly receive allocation of a resource for uplink data of the S-M2M device from the base station through a downlink control channel and can transmit the uplink data of the S-M2M device to the base station using the allocated resource. Here, uplink resource allocation information associated with the resource for transmission of uplink data of the S-M2M device is transmitted after being masked with a specific identifier such that the resource can be discriminated from the resource for transmission of uplink data of the C-M2M device. Alternatively, information indicating whether the resource is a resource for the C-M2M device or a resource for the S-M2M device is included in the uplink resource allocation information.

The following is a description of an example of a method for transmitting data in a wireless communication system to which device cooperation is applied. Although this method will be described with reference to an uplink data transmission method, it will be apparent that the same method can be equally applied to a downlink data transmission method.

Figure 5:
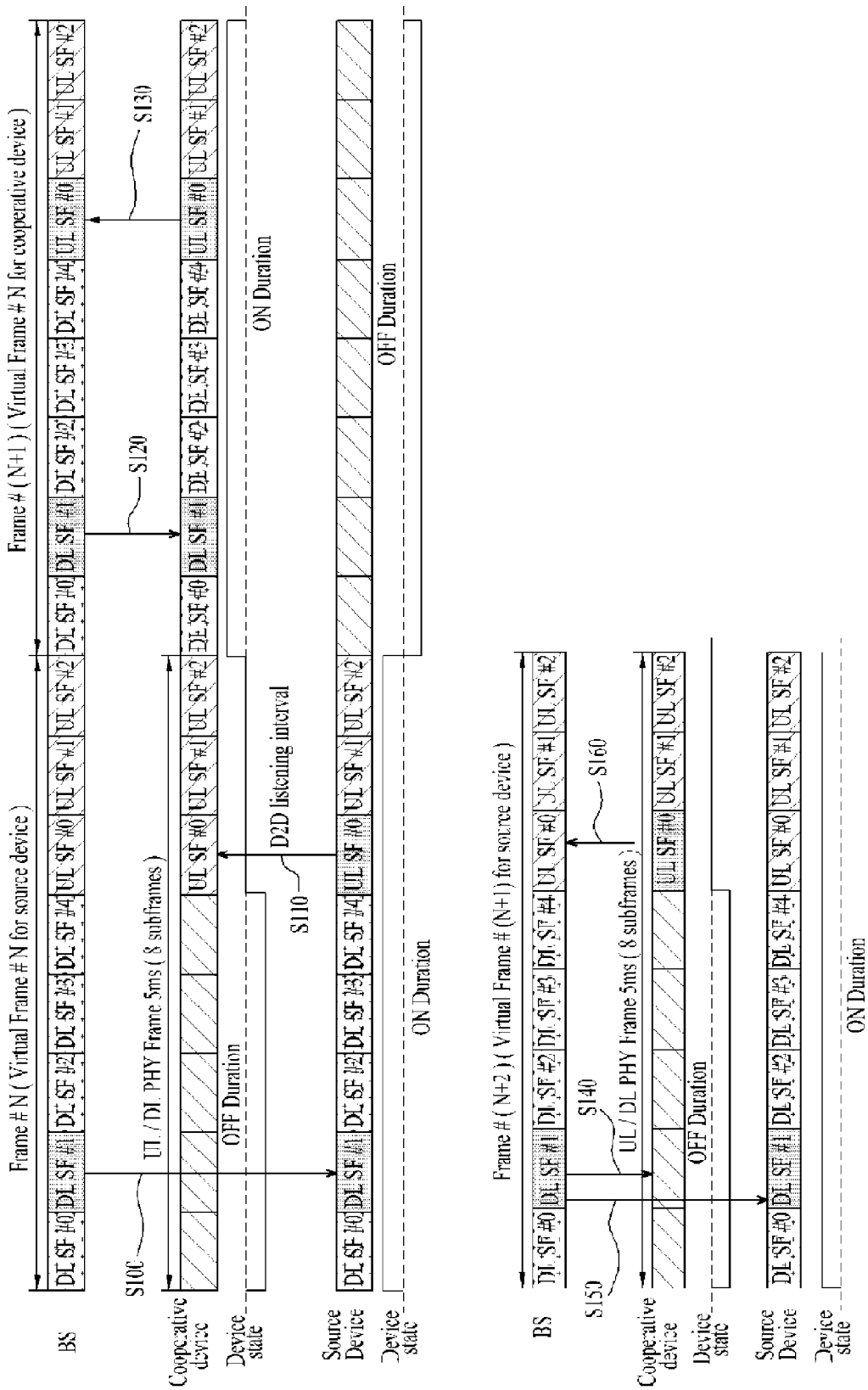
FIG. 5 illustrates a method for transmitting data according to a first embodiment of the present invention.

FIG. 5 illustrates a method for transmitting data according to a first embodiment of the present invention. Specifically, this embodiment will be described with reference to, as an example, an uplink data transmission procedure in the case in which, although an S-M2M device has successfully transmitted uplink data to a C-M2M device, the C-M2M device has failed to transmit the uplink data of the S-M2M device to a base station.

The base station allocates an uplink resource for the S-M2M device and transmits allocation information of the uplink resource to the S-M2M device through downlink subframe #1 of frame #N (S100). The S-M2M device receives the allocation information of the uplink resource on the subframe #1 and transmits uplink data to the C-M2M device using the allocated uplink resource (uplink subframe #0) (S110). The C-M2M device receives the uplink data of the S-M2M device on the uplink subframe #0. In the uplink subframe #0, which is a D2D listening interval, the C-M2M device needs to receive the uplink data transmitted by the S-M2M device.

In frame #N+1, the base station allocates an uplink resource for the C-M2M device and transmits allocation information of the uplink resource to the C-M2M device through downlink subframe #1 (S120). Here, the base station may not transmit allocation information of the uplink resource for the C-M2M device. This is because the base station implicitly knows that the C-M2M device can transmit, to the base station, the uplink data of the S-M2M device in the same uplink resource region (uplink subframe #0) as that in which the C-M2M device has received the uplink data from the S-M2M device in a D2D listening interval. The C-M2M device transmits the uplink data of the S-M2M device received from the S-M2M device to the base station using the allocated uplink resource (uplink subframe #0) (S130). In the case in which uplink data has been transmitted on the allocated uplink subframe #0, the base station can determine that the S-M2M device has successfully transmitted uplink data to the C-M2M device. However, in the case in which the base station has failed to receive uplink data from the C-M2M device, the base station transmits negative-acknowledgement (NACK) information indicating that the base station has failed to receive uplink data from the S-M2M device to the C-M2M device on downlink subframe #1 in frame #N+2 (S140). The base station also transmits acknowledgement (ACK) information indicating that the base station has successfully received uplink data from the S-M2M device to the S-M2M device on the downlink subframe #1 (S150) in order to prevent the S-M2M device from retransmitting uplink data and to allow the S-M2M device to enter the off-state mode early to achieve power saving when the S-M2M device does not have uplink data to be additionally transmitted. Upon receiving the NACK information, the C-M2M device retransmits uplink data of the S-M2M device to the base station using the uplink subframe #0 which is the same uplink resource region as that in which the C-M2M device has received the uplink data from the S-M2M device in a D2D listening interval according to the synchronous (non-adaptive) HARQ retransmission scheme (S160). The C-M2M device may be set so as to be able to receive and decode ACK/NACK information in the off-state mode. The C-M2M device may also be configured so as to be switched from the off-state mode to the on-state mode to receive ACK/NACK information during a specific duration.

Figure 6:
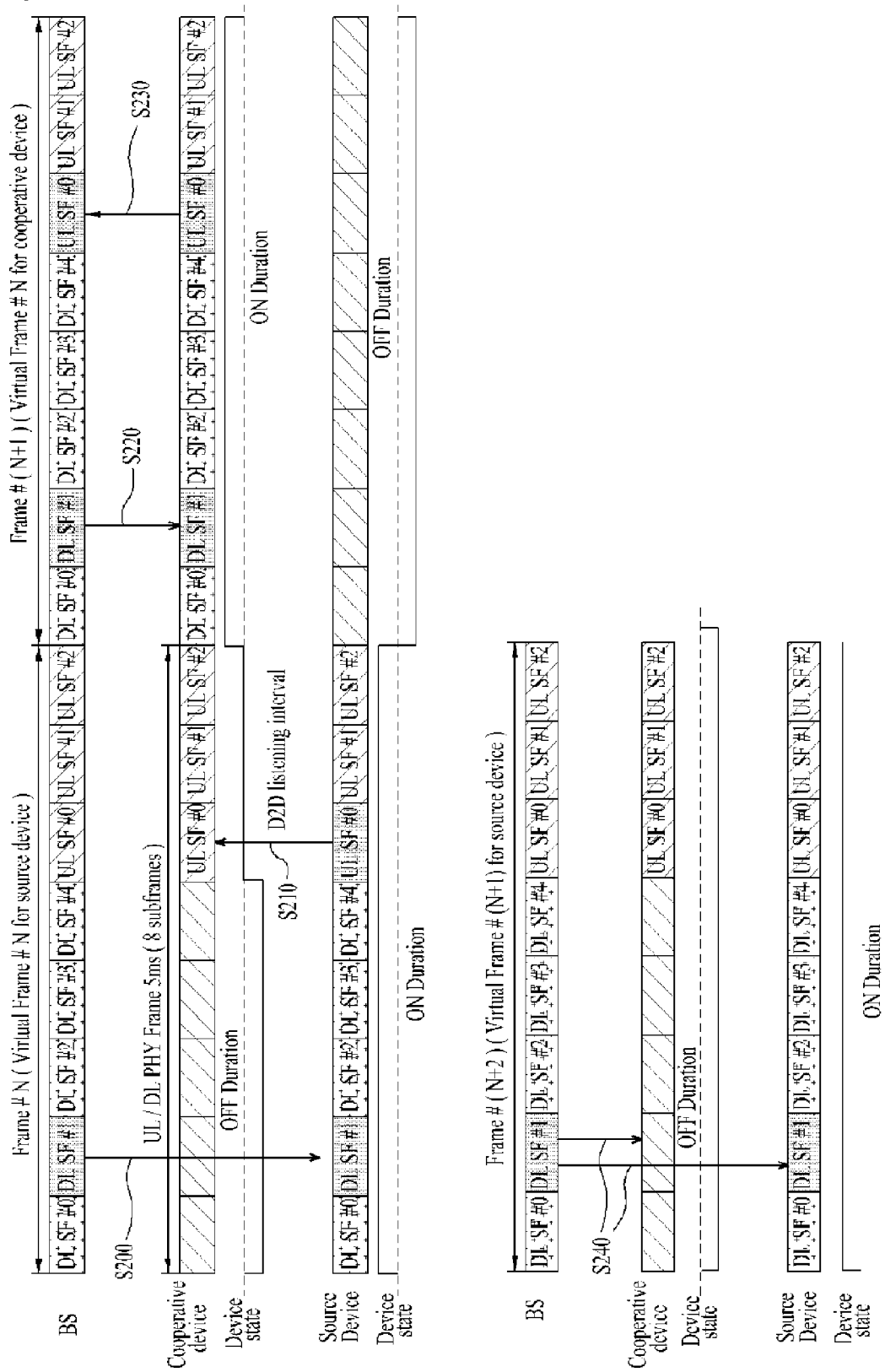
FIG. 6 illustrates a method for transmitting data according to a second embodiment of the present invention.

FIG. 6 illustrates a method for transmitting data according to a second embodiment of the present invention. Specifically, this embodiment will be described with reference to, as an example, an uplink data transmission procedure in the case in which an S-M2M device has successfully transmitted uplink data to a C-M2M device and the C-M2M device has also successfully transmitted the uplink data of the S-M2M device to a base station.

The base station allocates an uplink resource for the S-M2M device and transmits allocation information of the uplink resource to the S-M2M device through downlink subframe #1 of frame #N (S200). The S-M2M device receives the allocation information of the uplink resource on the subframe #1 and transmits uplink data to the C-M2M device using the allocated uplink resource (uplink subframe #0) (S210). The C-M2M device receives the uplink data of the S-M2M device on the uplink subframe #0. In the uplink subframe #0, which is a D2D listening interval, the C-M2M device needs to receive the uplink data transmitted by the S-M2M device.

In frame #N+1, the base station allocates an uplink resource for the C-M2M device and transmits allocation information of the uplink resource to the C-M2M device through downlink subframe #1 (S220). Here, the base station may not transmit allocation information of the uplink resource for the C-M2M device. This is because the base station implicitly knows that the C-M2M device can transmit, to the base station, the uplink data of the S-M2M device in the same uplink resource region (uplink subframe #0) as that in which the C-M2M device has received the uplink data from the S-M2M device in a D2D listening interval. The C-M2M device transmits the uplink data of the S-M2M device received from the S-M2M device to the base station using the allocated uplink resource (uplink subframe #0) (S230). In the case in which uplink data has been transmitted on the allocated uplink subframe #0, the base station can determine that the S-M2M device has successfully transmitted uplink data to the C-M2M device. Since the base station has successfully received uplink data from the C-M2M device, the base station transmits ACK information indicating that the base station has successfully received uplink data from the S-M2M device to the C-M2M device on downlink subframe #1 of frame #N+2 (S240). The purpose of transmitting this ACK information is to prevent the C-M2M device from retransmitting uplink data of the S-M2M device and also to allow the S-M2M device to enter the off-state mode early to achieve power saving when the S-M2M device does not have uplink data to be additionally transmitted. The C-M2M device may be set so as to be able to receive and decode ACK/NACK information in the off-state mode. The C-M2M device may also be configured so as to be switched from the off-state mode to the on-state mode to receive ACK/NACK information during a specific duration.

Figure 7:
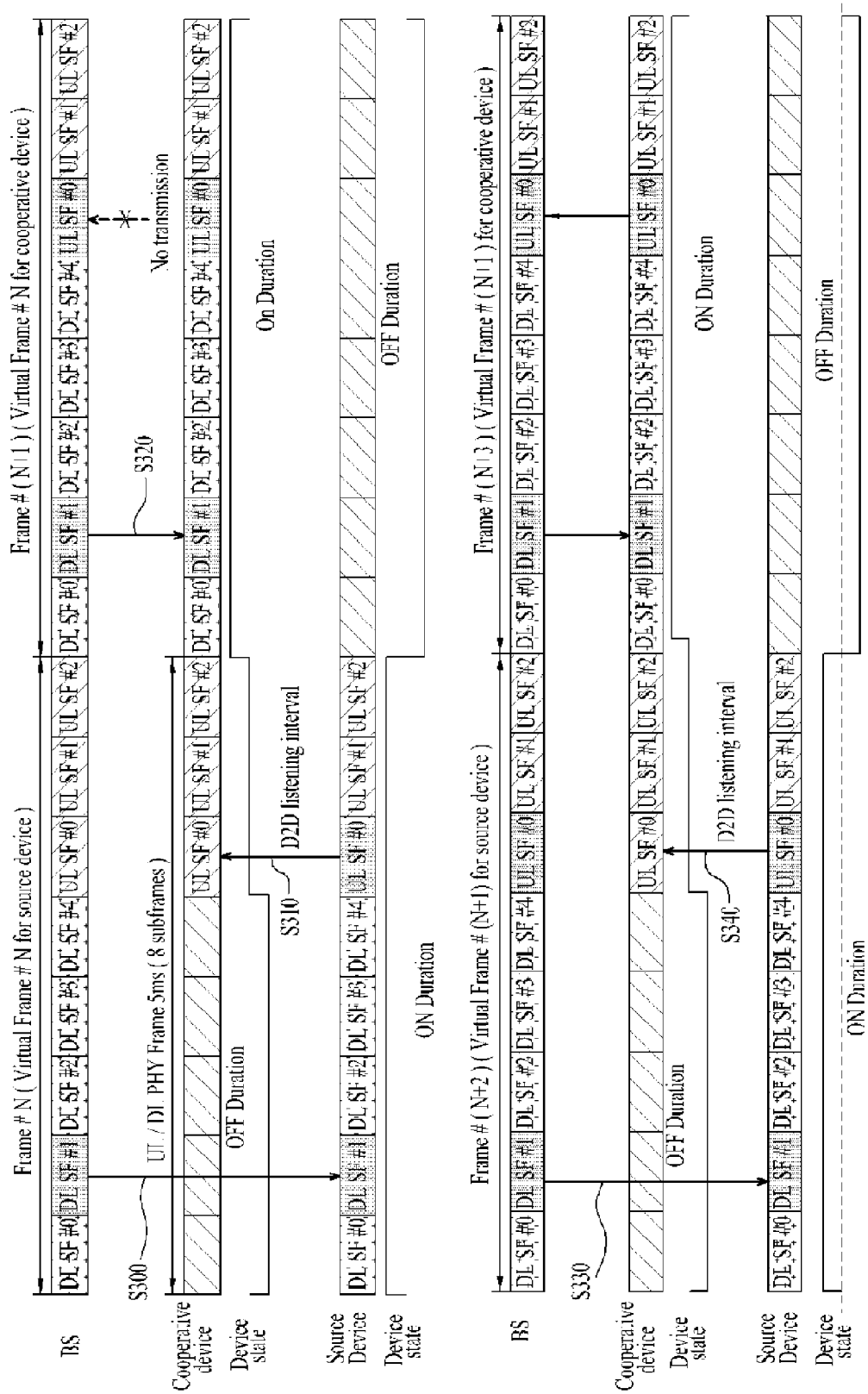
FIG. 7 illustrates a method for transmitting data according to a third embodiment of the present invention.

FIG. 7 illustrates a method for transmitting data according to a third embodiment of the present invention. Specifically, this embodiment will be described with reference to, as an example, an uplink data transmission procedure in the case in which an S-M2M device has failed to transmit uplink data to a C-M2M device.

The base station allocates an uplink resource for the S-M2M device and transmits allocation information of the uplink resource to the S-M2M device through downlink subframe #1 of frame #N (S300). The S-M2M device receives the allocation information of the uplink resource on the subframe #1 and transmits uplink data to the C-M2M device using the allocated uplink resource (uplink subframe #0) (S310). The C-M2M device receives the uplink data of the S-M2M device on the uplink subframe #0. In the uplink subframe #0, which is a D2D listening interval, the C-M2M device needs to receive the uplink data transmitted by the S-M2M device.

In frame #N+1, the base station allocates an uplink resource for the C-M2M device and transmits allocation information of the uplink resource to the C-M2M device through downlink subframe #1 (S320). Here, the C-M2M device cannot transmit uplink data of the S-M2M device to the base station since the C-M2M device has failed to receive the uplink data from the S-M2M device although the C-M2M device has received the allocation information of the uplink resource in the downlink subframe #1. When uplink data has not been transmitted in the allocated uplink subframe #0, the base station may determine that the S-M2M device has failed to transmit uplink data to the C-M2M device. The base station transmits NACK information indicating that the base station has failed to receive the uplink data of the S-M2M device through downlink subframe #1 of frame #N+2 (S330). The base station also transmits allocation information of an uplink resource through the downlink subframe #1 (S330). The S-M2M device receives the allocation information of the uplink resource and the NACK information on the downlink subframe #1 and retransmits the uplink data of the S-M2M device through the allocated uplink resource (uplink subframe #0) (S340). Thereafter, the above procedure is repeated in the same manner.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

INDUSTRIAL APPLICABILITY

The method for transmitting data by an M2M device according to the present invention can be applied to various wireless communication systems such as 3GPP LTE/LTE-A and IEEE 802.

The invention claimed is:

1. A method for transmitting data by a source User Equipment (UE) in a wireless communication system, the method comprising:
   transmitting uplink data of the source UE to a cooperative UE on a first uplink subframe of an Nth frame, the uplink data being transferred by the cooperative UE to a base station in a first uplink subframe of an (N+1)th frame;
   receiving feedback information, which is either ACK or NACK in response to the transmitted uplink data of the source UE directly from the base station in a second downlink subframe of an (N+2)th frame;
   determining whether to perform of a retransmission of the uplink data of the source UE to the cooperative UE based on the received ACK or NACK; and
   performing the retransmission of the uplink data of the source UE to the cooperative UE, when the received feedback information is NACK,
   wherein the retransmission of the uplink data of the source UE is performed on a first uplink subframe of an (N+2)th frame.

2. The method according to claim 1, wherein the Nth frame and the (N+2)th frame are intervals in which the cooperative UE operates in an off-state mode for power saving and the (N+1)th frame is an interval in which the cooperative UE operates in an on-state mode in which the cooperative UE can transmit or receive data.

3. The method according to claim 2, wherein each uplink subframe of the Nth frame and the (N+2)th frame is a Device to Device (D2D) listening interval in which the cooperative UE receives uplink data of the source UE from the source UE and the D2D listening interval is included in an interval in which the cooperative UE operates in the off-state mode.

4. The method according to claim 2, wherein the interval in which the cooperative UE operates in the off-state mode includes a D2D listening interval in which the cooperative UE receives data and decodes the received data.

5. The method according to claim 1, wherein an uplink resource region through which the cooperative UE receives the uplink data of the source UE from the source UE is identical to an uplink resource region through which the cooperative UE transmits the uplink data of the source UE to the base station.

6. A source User Equipment (UE) for transmitting data in a wireless communication system, the apparatus comprising:
   a transmitter;
   a receiver; and
   a processor configured to:
      control the transmitter to transmit uplink data of the source UE to a cooperative UE on a first uplink subframe of an Nth frame, the uplink data being transferred by the cooperative UE to a base station in a first uplink subframe of an (N+1)th frame;
      control the receiver to receive feedback information which is either ACK or NACK in response to the transmitted uplink data of the source UE directly from the base station in a second downlink subframe of an (N+2)th frame;
      determine whether to perform of a retransmission of the uplink data of the source UE to the cooperative UE based on the received ACK or NACK; and
      control the transmitter to perform the retransmission of the uplink data of the source UE to the cooperative UE, when the received feedback information is NACK,
   wherein the retransmission of the uplink data of the source UE is performed on a first uplink subframe of an (N+2)th frame.

7. The apparatus according to claim 6, wherein the Nth frame and the (N+2)th frame are intervals in which the cooperative UE operates in an off-state mode for power saving and the (N+1)th frame is an interval in which the cooperative UE operates in an on-state mode in which the cooperative UE can transmit or receive data.

8. The apparatus according to claim 7, wherein each uplink subframe of the Nth frame and the (N+2)th frame is a Device to Device (D2D) listening interval in which the cooperative UE receives uplink data of the source UE from the source UE and the D2D listening interval is included in an interval in which the cooperative UE operates in the off-state mode.

9. The apparatus according to claim 7, wherein the interval in which the cooperative UE operates in the off-state mode includes a D2D listening interval in which the cooperative UE receives data and decodes the received data.

10. The apparatus according to claim 6, wherein an uplink resource region through which the cooperative UE receives the uplink data of the source UE from the source UE is identical to an uplink resource region through which the cooperative UE transmits the uplink data of the source UE to the base station.

11. A method for receiving data by a base station in a wireless communication system, the method comprising:
   receiving uplink data of a source UE from a cooperative UE on a first uplink subframe of an Nth frame;
   decoding the received uplink data; and
   transmitting feedback information which is either ACK or NACK in response to the received uplink data to both the source UE and the cooperative UE based on a result of the decoding on a second subframe of an (N+1)th frame,
   wherein ACK is transmitted to the source UE and NACK is transmitted to the cooperative UE when the base station has failed to decode the received uplink data successfully, and
   wherein ACK is transmitted to both the source UE and the cooperative UE when the base station has decoded the received uplink data successfully.

12. A base station for receiving data in a wireless communication system, the base station comprising:
   a transmitter:
   a receiver; and
   a controller configured to:
      control the receiver to receive uplink data of a source UE from a cooperative UE on a first uplink subframe of an Nth frame;
      decode the received uplink data; and
      control the transmitter to transmit feedback information which is either ACK or NACK in response to the received uplink data to both the source UE and the cooperative UE based on a result of the decoding on a second subframe of an (N+1)th frame,
   wherein ACK is transmitted to the source UE and NACK is transmitted to the cooperative UE when the base station has failed to decode the received uplink data successfully, and
   wherein ACK is transmitted to both the source UE and the cooperative UE when the base station has decoded the received uplink data successfully.

* * * * *